United States Patent [19]

Fujimoto et al.

[11] Patent Number: 5,712,924

[45] Date of Patent: Jan. 27, 1998

[54] IMAGE PROCESSING APPARATUS

[75] Inventors: Masaya Fujimoto; Haruo Yamamoto; Tadashi Miyazaki; Hidechika Kumamoto; Shinji Hayashi, all of Osaka, Japan

[73] Assignee: Mita Industrial Co., Ltd., Osaka, Japan

[21] Appl. No.: 551,293

[22] Filed: Oct. 31, 1995

[30] Foreign Application Priority Data

| Nov. 7, 1994 | [JP] | Japan | 6-272632 |
| Nov. 7, 1994 | [JP] | Japan | 6-272633 |
| Nov. 7, 1994 | [JP] | Japan | 6-272634 |
| Nov. 7, 1994 | [JP] | Japan | 6-272635 |

[51] Int. Cl.$^6$ .................................. G03F 3/08
[52] U.S. Cl. .................. 382/165; 358/512; 358/515; 358/529; 382/162
[58] Field of Search ................... 358/522, 529, 358/518, 538, 512, 532, 515, 530, 447, 540; 382/167, 165, 162, 181, 199, 195, 170

[56] References Cited

U.S. PATENT DOCUMENTS

| 5,251,023 | 10/1993 | Arimoto et al. | 358/529 |
| 5,420,938 | 5/1995 | Funada et al. | 358/529 |
| 5,483,361 | 1/1996 | Shimizu et al. | 358/529 |
| 5,592,311 | 1/1997 | Hibi | 358/529 |

FOREIGN PATENT DOCUMENTS 411911  2/1991  European Pat. Off. .

OTHER PUBLICATIONS

Japan Patent Abstracts No. 6038054.
European Search Report No. 95117532 dated Nov. 7, 1996.

*Primary Examiner*—Edward L. Coles, Sr.
*Assistant Examiner*—Fan Lee
*Attorney, Agent, or Firm*—Beveridge, DeGrandi, Weilacher & Young, L.L.P.

[57] ABSTRACT

A color image is by an optical scanner for conversion into three primary color data corresponding to the respective densities of the three primary colors. An edge detector detects a pixel of an edge based on the three primary color data. A pixel color judging device judges a color of a target pixel based on the three primary color data of the target pixel and its adjacent pixels. Based on edge detection results of the edge detector and pixel color judgment results of the pixel color judging device, detected is a pixel of a black edge. Judgement conditions for the pixel color judgement are established based upon characteristics that depend upon the order of arrangement of color filters in a scanner.

6 Claims, 19 Drawing Sheets

FIG. 5

| 0 | 1 | 0 |
|---|---|---|
| 1 | 4 | 1 |
| 0 | 1 | 0 |

| A | B | C |
|---|---|---|
| D | E | F |
| G | H | I |

FIG. 7

| 0 | 0 | −4 | 0 | 0 |
|---|---|---|---|---|
| −1 | −3 | 24 | −3 | −1 |
| 0 | 0 | −4 | 0 | 0 |

| A | B | C | D | E |
|---|---|---|---|---|
| F | G | H | I | J |
| K | L | M | N | O |

IMAGE PROCESSING APPARATUS

BACKGROUND OF THE INVENTION

1. Field of the Invention

The present invention relates to an image processing apparatus such as a color copier, and more particularly to an image processing apparatus capable of accurately detecting an edge portion of a black character region.

2. Related Arts

In a color copier, a color original is generally read by a scanner comprising CCD for conversion into electrical signals of three primary colors of the additive color process which include red(R), green(G) and blue(B). The electrical signals of red(R), green(G) and blue(B) are converted into the three primary color data of the subtractive color process which include their complementary colors of cyan(C), magenta(M) and yellow(Y).

Black (BK) data is generated from the three primary color data including cyan(C), magenta(M) and yellow(Y). For each pixel, the minimum value, min(Y, M, C), of the components Y, M and C is extracted. A value $\beta$ min(Y, M, C) obtained by multiplying the extracted value by a correction coefficient $\beta$ is used as BK output (BKout=$\beta$ min(Y, M, C)).

Y output (Yout) has a value (Yout=Y−min(Y, M, C)) obtained by subtracting the minimum value, min(Y, M, C), of the components Y, M and C, from the component Y. Similarly, M output (Mout) has a value (Mout=M−min(Y, M, C)) obtained by subtracting the minimum value, min(Y, M, C), from the component M, and C output (Cout) a value (Cout=C−min(Y, M, C)) obtained by subtracting min(Y, M, C) from the component C.

Development is effected on each color based on each of the output signals which include Yout, Mout, Cout and BKout. In developing a color of yellow(Y), for example, a laser beam modulated by signal Yout scans the photoconductive surface to form an electrostatic latent image thereon which corresponds to the yellow(Y) of an original image. The electrostatic latent image is developed with toner powder of yellow into a toner image, which in turn is transferred to a copy sheet. A similar development process is performed with respect to magenta(M), cyan(C) and black(BK).

In the color copier, an inputted image is classified into three regions including a dither region, a black character region and a photograph region, according to the respective characteristics thereof. The classified regions are subject to proper processes which suit them respectively, thereby assuring an image of high quality.

An image of the black character region is subject to, for example, a process for enhancing the black character. An image of the photograph region is subject to, for example, a smoothing process and a sharpening process. An image of the dither region is subject to, for example, a process for preventing moire (interference fringe).

To effect the process for enhancing the black character in a black character region, the black character region must be extracted accurately. The black character region is extracted according to judgment on an edge and judgment on a pixel color. Conventionally, the pixel color has been determined based on only the image data of a target pixel.

In a scanner currently used, filters of B, G and R for one pixel are arranged, for example, in the order of B, G and R in the scanning direction, as shown in FIG. 14. Accordingly, in the rising edge of a black character region, a density relation of signals B, G and R is R>G>B, while that of signals Y, M and C is C>M>Y. Conversely, in the falling edge of a black character region, the density relation of signals B, G and R is B>G>R, while that of signals Y, M and C is Y>M>C.

As a result, a method of judging a pixel color based on only the image data of the target pixel fails to ensure a correct judgment on the pixel color of an edge (black edge) of the black character region. This results in a problem that accurate detection of the black edge is not assured.

SUMMARY OF THE INVENTION

It is, therefore, an object of the invention to provide an image processing apparatus capable of accurately detecting a black edge.

Another object of the invention is to provide an image processing apparatus which is capable of detecting a boundary portion between a black edge and a base portion, thereby enabling enhancement of the black edge by effecting a predetermined process on the three primary color data of a pixel detected in the boundary portion.

A first image processing apparatus according to the invention comprises means for reading a color image by means of a scanner to convert it into the three primary color data which correspond to the respective densities of the three primary colors; edge detecting means for detecting a pixel of an edge portion based on the three primary color data; pixel color judging means for judging a color of a target pixel based on the three primary color data of the target pixel and the pixels adjacent thereto; and black edge detecting means for detecting a pixel of a black edge based on a detection result of the edge detecting means and a judgment result of the pixel color judging means.

The pixel color judging means which is generally employed comprises, for example, first judgment means for determining a color of a target pixel by selecting from black, white, chromatic color, gray and "assumed-to-be-gray" according to the three primary color data of the target pixel, and second judgment means which judges a color of the target pixel either gray or chromatic color based on a maximum density color thereof and pixel colors and maximum density colors of its adjacent pixels, the target pixel having been judged to be "assumed-to-be-gray" by the first judgment means.

In this case, selection/judgment conditions of the second judgment means are established based on the characteristics of a pixel color and a maximum density color of a black edge which depend upon an arrangement order of color filters in the scanner.

In the first image processing apparatus of the invention, a color image is read by an optical scanner for conversion into the three primary color data which correspond to the respective densities of the three primary colors. The edge detecting means detects a pixel of an edge based on the three primary color data. The pixel color judging means judges the color of the target pixel based on the three primary color data of the target pixel and its adjacent pixels. Then, a pixel of the black edge is detected according to the edge detection result of the edge detecting means and the pixel color judgment result of the pixel color judging means.

A second image processing apparatus according to the invention comprises means for reading a color image by means of a scanner to convert it into the three primary color data which correspond to the respective densities of the three primary colors; edge detecting means for detecting a pixel of an edge portion based on the three primary color data; pixel color judging means for judging a color of a target pixel based on the three primary color data of the target pixel and its adjacent pixels; and black edge detecting means for detecting a pixel of a black edge based on a detection result of the edge detecting means and a judgment result of the pixel color judging means.

The pixel color judging means generally employed is adapted to, for example, determine a color of the target pixel by selecting from five colors including black, white, chromatic color and gray and "assumed-to-be-gray", according to the three primary color data of the target pixel. The black edge detecting means generally employed, comprises judgment means which, for example, judges the target pixel a black edge pixel if a maximum density color of the target pixel is a maximum density color of the black edge, which depend upon an arrangement order of color filters in the scanner, the target pixel having been judged the edge pixel by the edge detecting means and judged to be "assumed-to-be-gray" by the pixel color judging means.

In the second image processing apparatus of the invention, a color image is read by an optical scanner to be converted into the three primary color data which correspond to the respective densities of the three primary colors. The edge detecting means detects a pixel of an edge based on the three primary color data. The pixel color judging means judges a color of a target pixel based on the three primary color data.

Thereafter, based on edge detection results of the edge detecting means, and a pixel color and a maximum density color of the target pixel, detected is a pixel of a black edge.

A third image processing apparatus according to the invention comprises means for reading a color image by means of a scanner to convert it into the three primary color data which correspond to the respective densities of the three primary colors; edge detecting means for detecting a pixel of an edge portion based on the three primary color data; pixel color judging means for judging a color of a target pixel based on the three primary color data; and black edge judging means for determining if the target pixel is in a black edge, based on an edge detection result, a pixel color and a maximum density color of the target pixel as well as edge detection results, pixel colors and maximum density colors of pixels adjacent the target pixel.

A fourth image processing apparatus according to the invention comprises means for reading a color image by means of a scanner to convert it into the three primary color data which correspond to the respective densities of the three primary colors; edge detecting means for detecting a pixel of an edge based on the three primary color data; pixel color judging means for judging a color of a target pixel based on the three primary color data of the target pixel and the pixels adjacent thereto; black edge detecting means for detecting a pixel of a black edge based on an edge detection result of the edge detecting means and a pixel color judgment result of the pixel color judging means; and means for detecting a blurred color pixel adjacent black edge which detects a pixel of a boundary portion between the black edge and a base portion, based on a black edge detection result of the black edge detecting means and a pixel color judgment result of the pixel color judging means.

The pixel color judging means which is generally employed comprises, for example, first judgment means for determining a color of a target pixel by selecting from black, white, chromatic color, gray and "assumed-to-be-gray" according to the three primary color data of the target pixel; and second judgment means which judges a color of a target pixel either gray or chromatic color, based on a maximum density color thereof and pixel colors and maximum density colors of the pixels adjacent thereto, the target pixel having been judged to be "assumed-to-be-gray" by the first judgment means.

In this case, selection/judgment conditions of the second judgment means are established based on the characteristics of a pixel color and a maximum density color of the black edge which depend upon an arrangement order of color filters in the scanner.

The means for detecting a blurred color pixel adjacent black edge, which is generally employed, includes judgment means for a blurred color pixel adjacent black edge which is adapted to judge whether the target pixel is in a boundary portion between the black edge and a base portion, based on a black edge detection result, a pixel color and a maximum density color of the target pixel; a black edge detection result of a next pixel on one side of the target pixel; and a black edge detection result and a pixel color of the next pixel on the other side of the target pixel.

In this case, selection/judgment conditions of the second judgment means are established based on the characteristics of a pixel color and a maximum density color of the aforementioned boundary portion, which characteristics depend upon an arrangement order of color filters in the scanner, and based on the characteristics of an image density of the aforementioned boundary portion.

In the fourth image processing apparatus of the invention, a color image is read by an optical scanner to be converted into the three primary color data which correspond to the respective densities of the three primary colors. The edge detecting means detects a pixel of an edge based on the three primary color data. The pixel color judging means judges a color of a target pixel based on the three primary color data of the target pixel and its adjacent pixels.

Then, based on an edge detection result of the edge detecting means and a pixel color judgment result of the pixel color judging means, detected is a pixel of a black edge.

BRIEF DESCRIPTION OF THE DRAWINGS

FIG. 5 is a schematic view illustrating a filtering process performed by a first preprocess section.

FIG. 6 is a schematic view illustrating a filtering process performed by a first preprocess section.

FIG. 7 is a schematic view illustrating a filtering process performed by a second preprocess section.

FIG. 8 is a schematic view illustrating a filtering process performed by a second preprocess section.

DESCRIPTION OF PREFERRED EMBODIMENTS (1) First Embodiment

Referring to FIGS. 1 to 13, a first embodiment of the present invention will be described in detail as below.

(a) Arrangement of Black Edge Detecting Section

Figure 1:
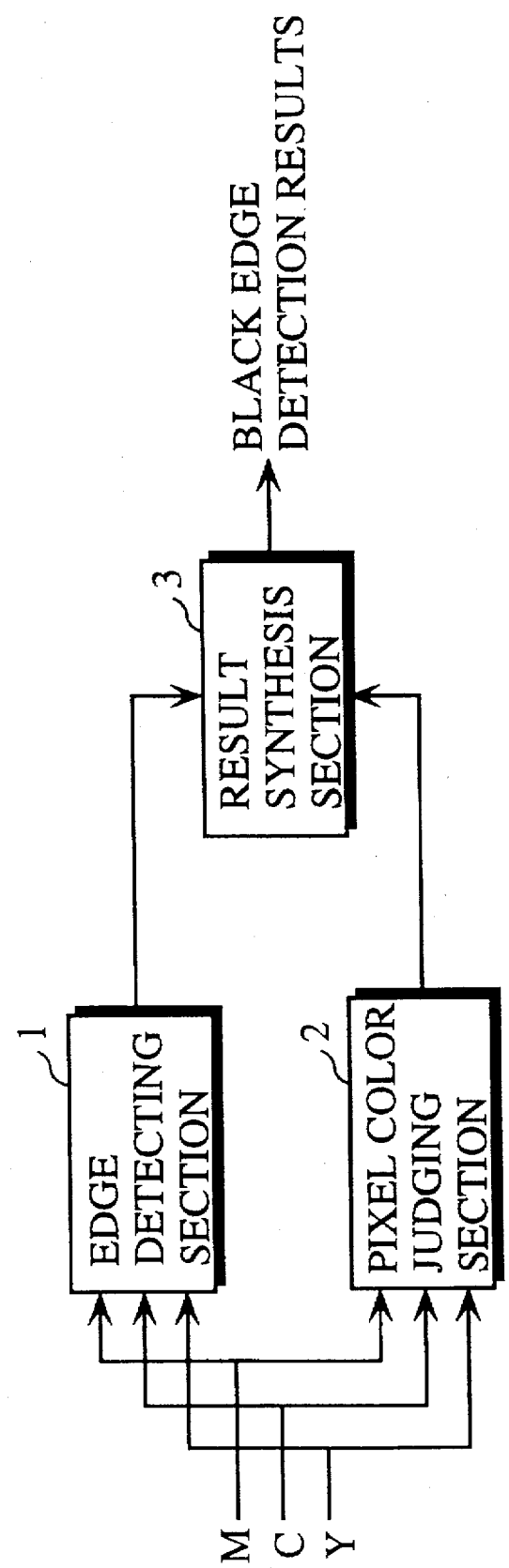
FIG. 1 is a block diagram illustrating the arrangement of a black edge detecting section according to a first embodiment of the present invention.

FIG. 1 shows the arrangement of a black edge detecting section.

The black edge detecting section comprises a edge detecting section 1, a pixel color judging section 2 and a result synthesis section 3. The edge detecting section 1 is supplied with M, C, Y signals generated from signals read by a scanner not shown, and outputs edge detection results.

Figure 14:
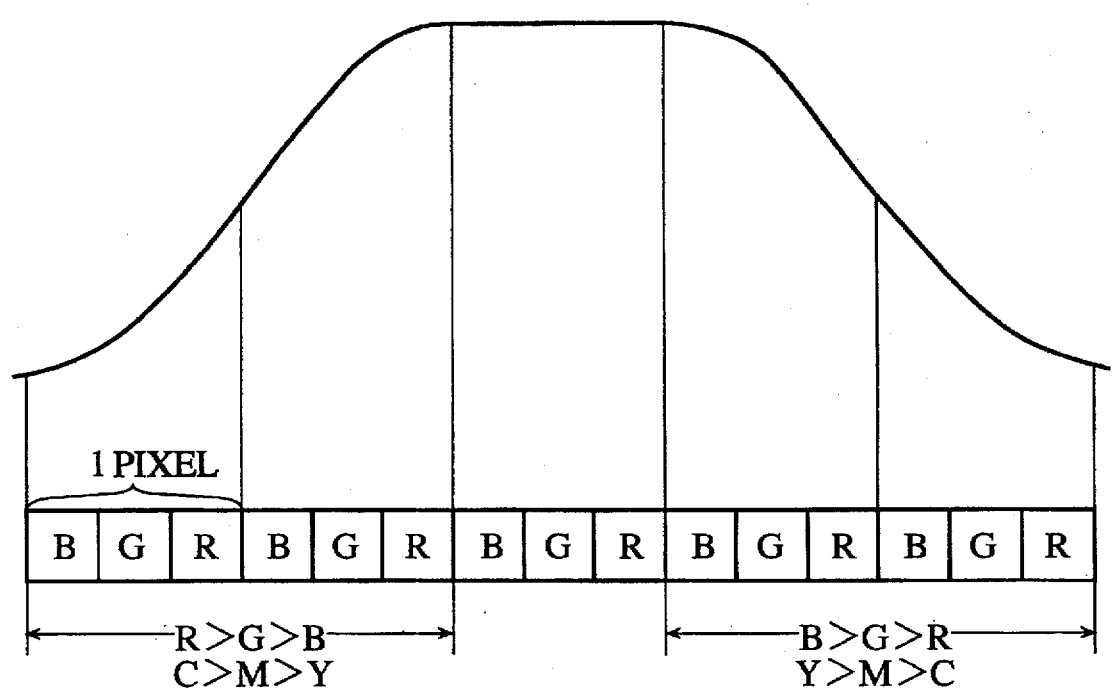
FIG. 14 is a schematic view illustrating that due to arrangement order of color filters, the characteristics of MCY signals change depending upon a black rising edge and a black falling edge.

The pixel color judging section 2 is also supplied with M, C and Y signals and, outputs pixel color judgment results. The result synthesis section 3 is supplied with detection results of the edge detecting section 1 and judgment results of the pixel color judging section 2, and outputs black edge detection results. In this embodiment, color filters disposed in the scanner are arranged in the order of B, G and R in the scanning direction, as shown in FIG. 14.

(B) Edge Detecting Section 1

Figure 2:
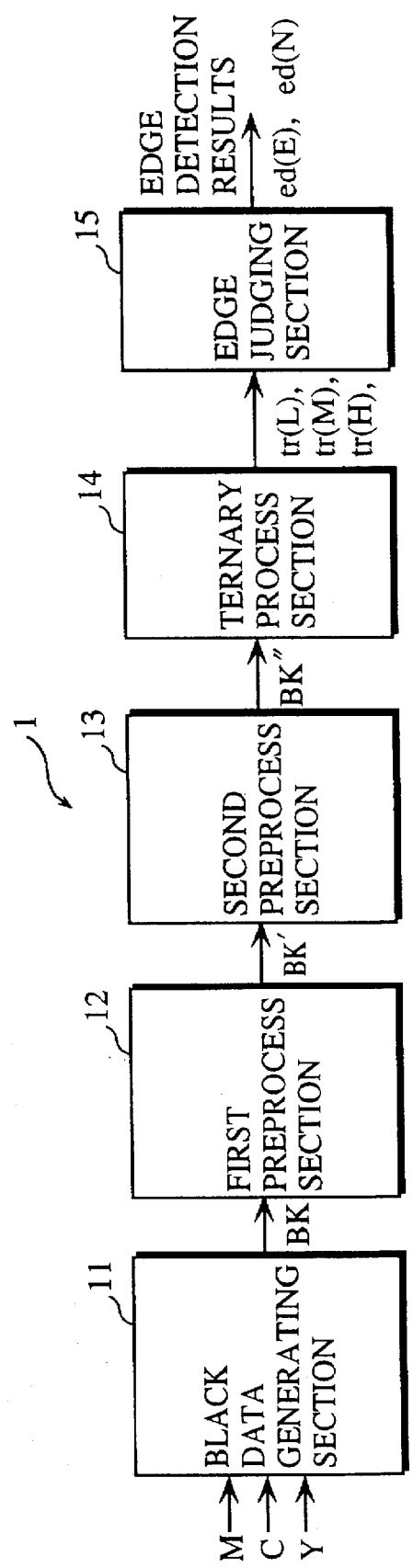
FIG. 2 is a block diagram illustrating the arrangement of the edge detecting section of FIG. 1.

FIG. 2 shows the arrangement of the edge detecting section 1.

The edge detecting section 1 comprises a black data generating section 11, a first preprocess section 12, a second preprocess section 13, a ternary process section 14 and an edge judging section 15.

(b-1) Black Data Generating Section 11

The black data generating section 11 obtains the minimum value min(M, C, Y) of 8-bit image data of M, C and Y image data of 8-bits, and outputs the minimum value thus obtained as black component data BK. The black component data (BK) is represented by the following formula (1).

$$BK = \min(M, C, Y) \quad (1)$$

(b-2) First Preprocess Section 12

At the first preprocess section 12, the black component data BK of each pixel is subject to a law-pass filtering process.

Figures 5, 6:
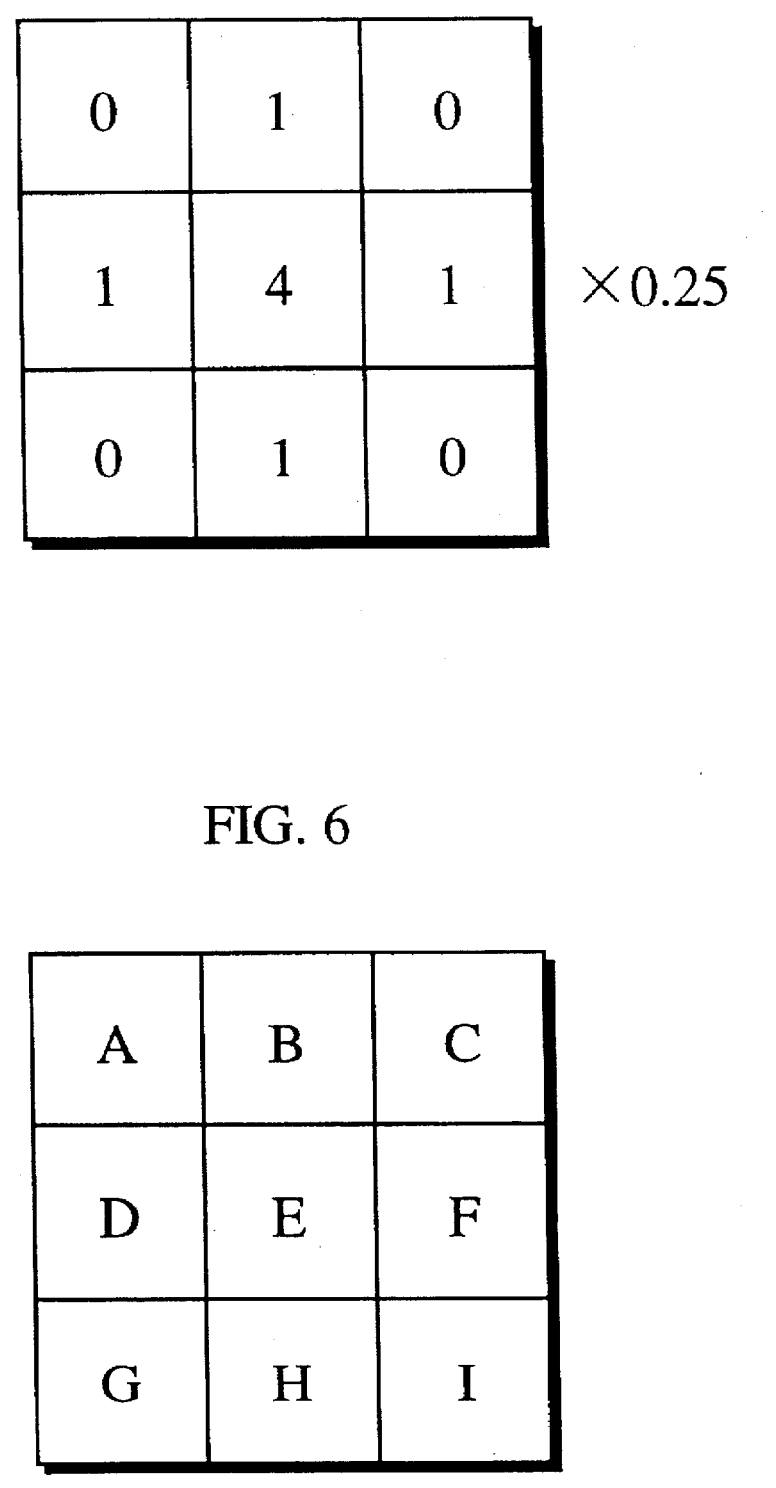

A 3×3 integral filter shown in FIG. 5, for example, is used to effect the low-pass filtering process on a target pixel. Specifically, if the black component data BK of pixels in the 3×3 matrix with the target pixel at the center thereof are represented by A through I respectively, as shown in FIG. 6, the black component data BK of the target pixel is converted into BK' (first process data) which is represented by the following formula (2).

$$BK' = (B+D+4E+F+H) \times 0.25 \quad (2)$$

(b-3) Second Preprocess Section 13

At the second preprocess section 13, the first process data BK' obtained by the first preprocess section 12 is subject to an edge enhancement filtering process.

For example, a 3×5 integral filter shown in FIG. 7 is used to effect the edge enhancement filtering process on the target pixel. Specifically, if the first process data BK' of pixels in the 3×5 matrix with the target pixel at the center thereof are represented by A through O respectively, the data BK of the target pixel is converted into BK" (second process data) which is represented by the following formula (3).

$$BK'' = (-4C - F - 3G + 24H - 3I - J - 4M) \times 0.125 \quad (3)$$

(b-4) Ternary Process Section 14

At the ternary process section 14, the second process data BK" of 8 bits obtained by the second preprocess section 13 are converted into ternary values by the use of two threshold values t1 and t2 (t1>t2).

Specifically, if BK"≧t1 the target pixel is determined to be a high-density pixel. If BK"≦t2, it is determined to be a low-density pixel. If t2<BK"<t1, it is determined to be a gray scale pixel. These judgment results are represented by 2-bit ternary data. Ternary data of a high-density pixel is represented by tr(H); that of a low-density pixel, tr(L); and that of the gray scale pixel, tr(M). The threshold value t1 is set, for example, at 160, while that of t2 is set, for example, at 50.

(b-5) Edge Judging Section 15

The edge judging section 15 performs an edge region judging process and a high-density edge region judging process.

Figure 9:
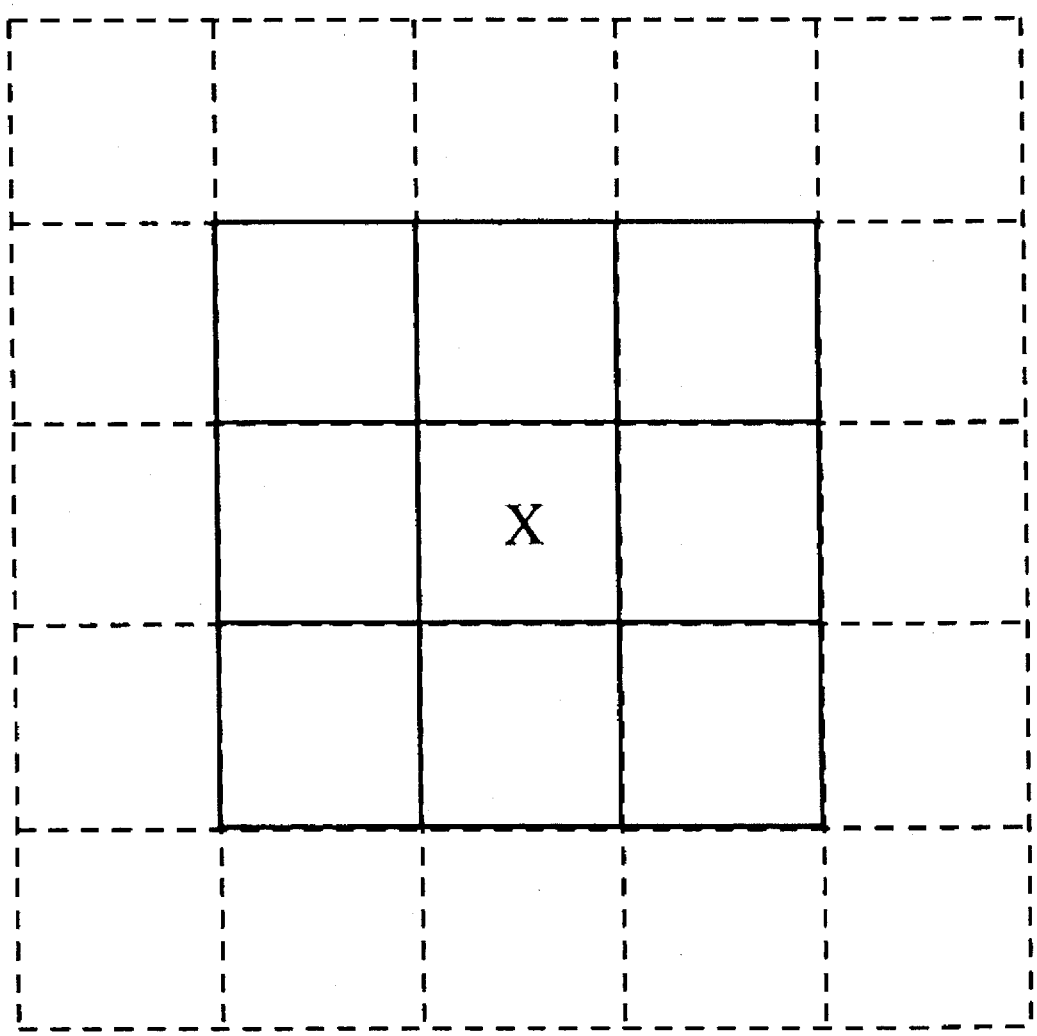
FIG. 9 is a schematic view illustrating an edge judging process performed by an edge judging section.

In the edge region judging process, if there are more than one high-density pixels (tr(H)) and low-density pixels (tr(L)) respectively in a 5×5 matrix region with a target pixel×at the center thereof, as shown in FIG. 9, pixels in a 3×3 matrix region with the target pixel x at the center thereof are determined to be edge pixels. Once any one of the pixels is determined to be an edge pixel by this edge region judgment process, the judgment result thereof is retained thereafter.

In the high-density edge region judging process, if a pixel determined to be the edge pixel is either a high-density pixel (tr(H)) or a gray scale pixel (tr(M)), the pixel is determined to be a high-density edge pixel. Judgment result data, ed(E), is outputted with respect to the high-density edge pixel, while judgment result data, ed(N), is outputted with respect to the other pixels.

(C) Pixel Color Judging Section 2

Figure 3:
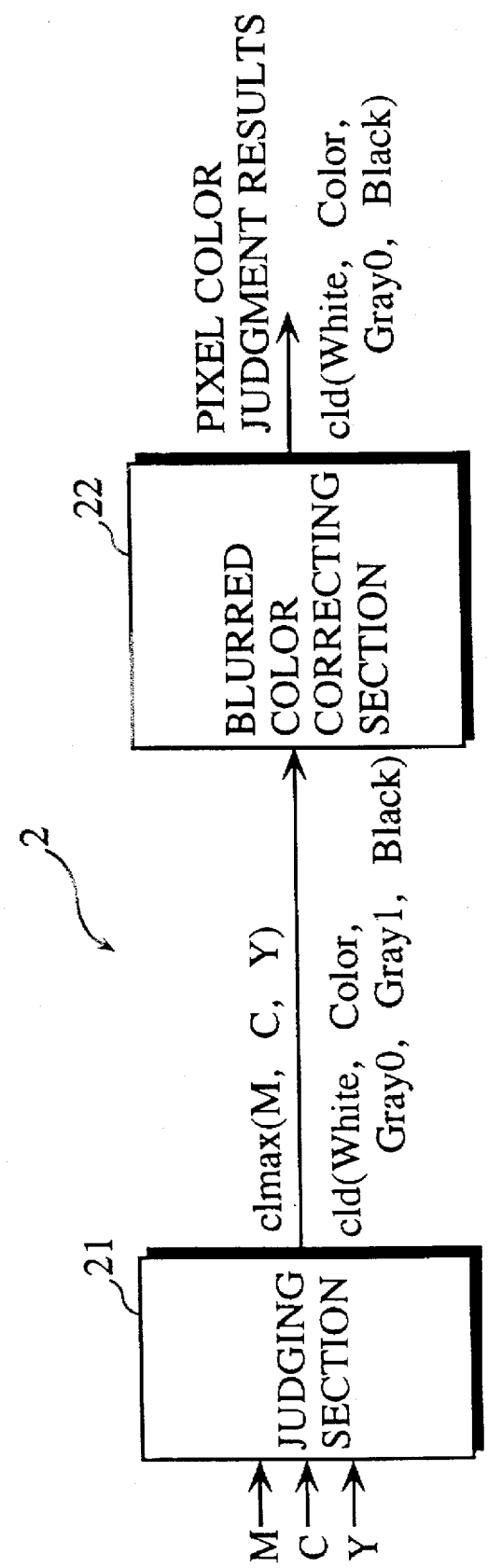
FIG. 3 is a block diagram illustrating the arrangement of the pixel color judging section of FIG. 1.

FIG. 3 shows the arrangement of the pixel color judging section 2.

The pixel color judgment section 2 comprises a judging section 21 and a blurred color correcting section 22.

(c-1) Judging Section 21

The judging section 21 performs a pixel color judging process based on M, C, Y data for each pixel.

Specifically, a maximum density, max(M, C, Y), and a color of maximum density, clmax(M, C, Y), are first extracted from M, C, Y data of a target pixel.

Further, a minimum density, min(M, C, Y), and a color of minimum density, clmin(M, C, Y), are extracted from the M, C, Y data of the target pixel.

Then, a pixel color, cld, of the target pixel is determined based on the maximum density, max(M, C, Y), and the minimum density, min(M, C, Y), thereof. In the pixel color judging process, a color of the target pixel is selected from black(Black), white(White), gray(Gray0), "assumed-to-be-gray"(Gray1) and chromatic color(Color). The pixel color judging process uses the following 5 threshold values.

- tbk: a threshold value for Black, which is set to be, for example, from 160 to 170.
- twh: a threshold value for White, which is set to be, for example from 30 to 40.
- tglv: a threshold value for Gray level, which is set, for example, at 70.
- tgw0: a threshold value for Gray0 range, which is set, for example, at 30.
- tgw1: a threshold value (tgw0<tgw1) for Gray1 range, which is set, for example, at 60.

The judgment conditions and the judgment results are as follows:

(i) If min(M, C, Y)≧tbk, it is judged that cld=Black.

(ii) If max(M, C, Y)≦twh, it is judged that cld =White.

(iii) If not applicable to the above condition (i) and if min(M, C, Y)≧tglv, and max(M, C, Y)−min(M, C, Y)≦tgw0, it is judged that cld=Gray0.

(iv) If not applicable to the above condition (i) or (iii) and if min(M, C, Y)≧tglv, and max(M, C, Y)−min(M, C, Y)≦tgw1, it is judged that cld=Gray1.

(v) If not applicable to conditions the above conditions (i) through (iv), it is judged that cld=Color.

As it is shown by the above-mentioned judgment conditions and judgment results, the judgment conditions for "assumed-to-be-gray" (Gray1) is set less rigid than those for gray (Gray0).

The judging section 21 outputs pixel color judgment result data, cld(White, Color, Gray0, Gray1, Black) and maximum density color data, clmax(M, C, Y).

(c-2) Blurred Color Correcting Section 22

At the blurred color correcting section 22, blurred color correction is effected on a pixel judged to be "assumed-to-be-gray" (Gray1) by the pixel color judging process, with reference to its adjacent pixels.

The blurred color correction determines whether a pixel judged "Gray1" by the pixel color judging process is in a black edge or not, referring to the pixels adjacent thereto; if the pixel is in the black edge, the pixel color, cld, of the pixel is changed into "Gray0" for correction, and otherwise into "Color".

Figure 10:
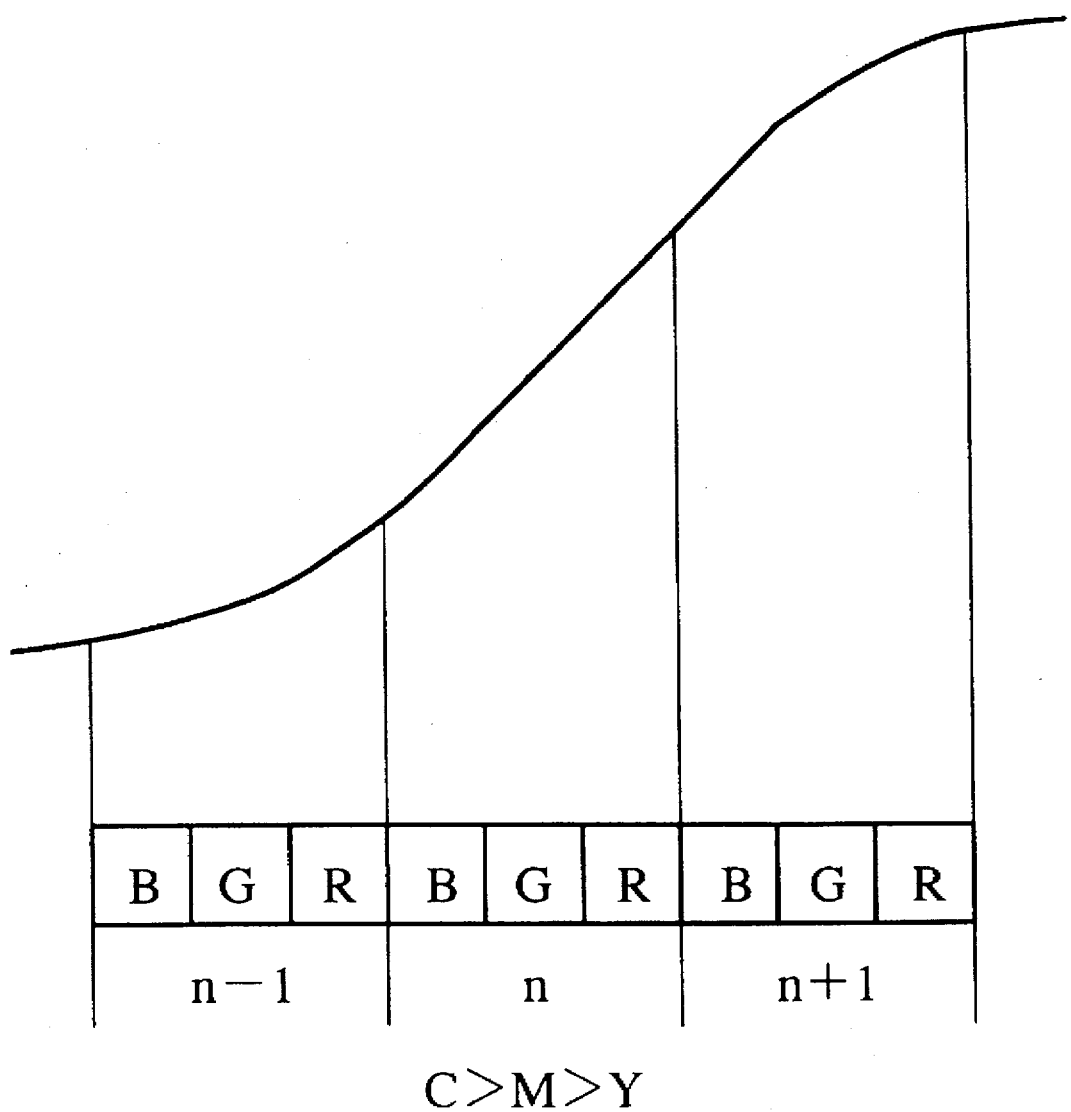
FIG. 10 is a schematic view illustrating a target pixel and the pixels adjacent thereto when the target pixel is in a black rising edge.
Figure 11:
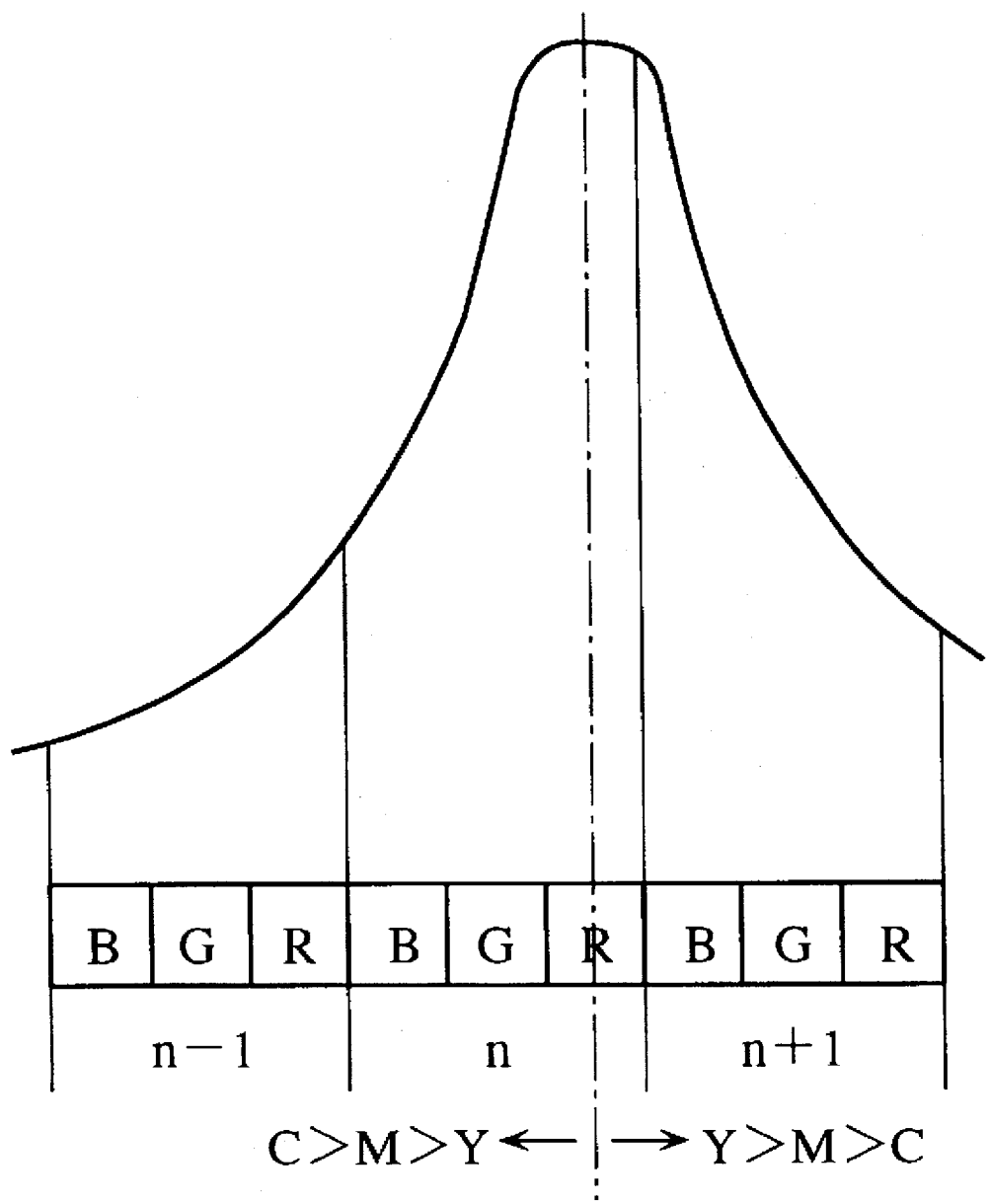
FIG. 11 is a schematic view illustrating a target pixel and the pixels adjacent thereto when the target pixel is in the black rising edge of a thin line.

If a pixel n (target pixel) which judged "Gray1" is in a black rising edge portion, as shown FIG. 10 or 11, the density relation of M, C, Y signals of the target pixel n is C>M>Y due to the arrangement of color filters. Accordingly, the maximum density color, clmax(M, C, Y), of the target pixel n is cyan C.

Figure 12:
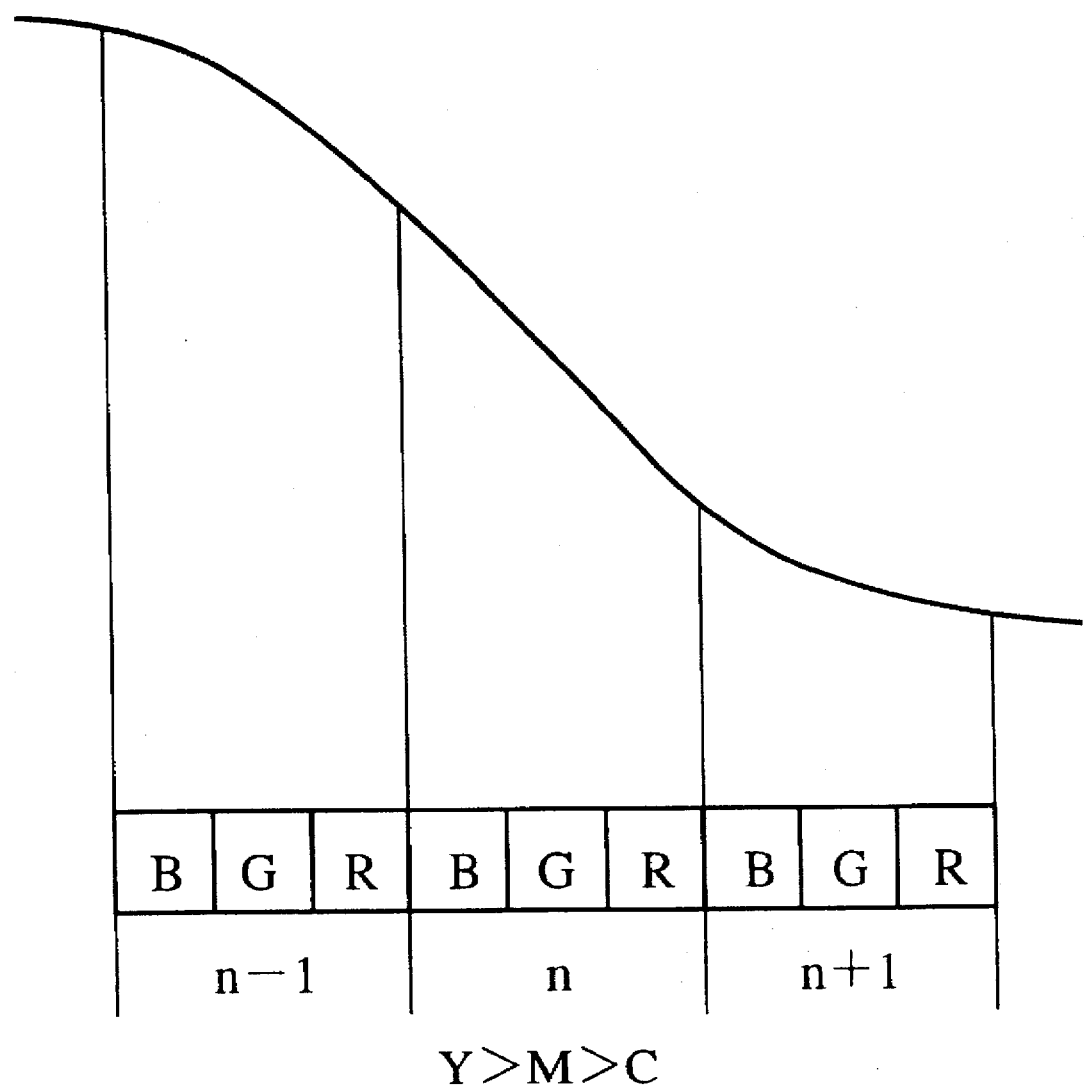
FIG. 12 is a schematic view illustrating a target pixel and the pixels adjacent thereto when the target pixel is in a black falling edge.
Figure 13:
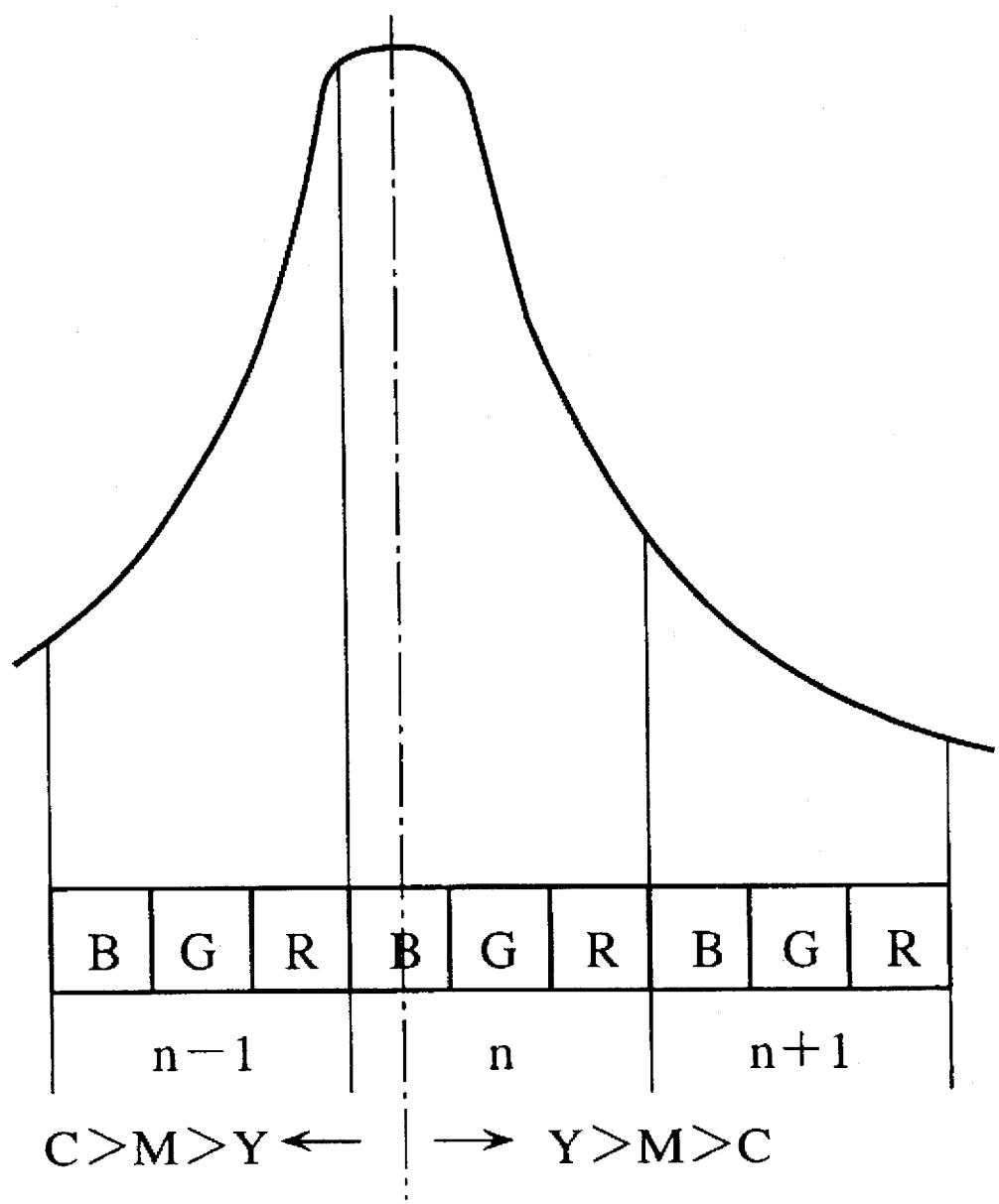
FIG. 13 is a schematic view illustrating a target pixel and the pixels adjacent thereto when the target pixel is in a black falling edge of a thin line.

If a pixel n (target pixel) which is judged "Gray1" is in a falling black edge, as shown in FIG. 12 or 13, the density relation of M, C, Y signals of the target pixel n is Y>M>C due to the arrangement of color filters. Accordingly, the maximum density color, clmax(M, C, Y), of the target pixel n is yellow Y.

If a maximum density color, clmax(C, M, Y), of a pixel n (target pixel) judged "Gray1" is magenta M, it is determined that the target pixel n is not in a black edge, and the pixel color, cld, thereof is changed into "Color" for correction.

Condition 1 is defined as that a pixel n (target pixel) judged "Gray1" has the maximum density color clmax(M, C, Y) of cyan C.

(i) Condition 1 clmax(M, C, Y)=C

If the condition 1 is satisfied, whether the target pixel is in a black rising edge or not is determined based on its adjacent pixels.

If the target pixel n is in the black rising edge, as shown in FIG. 10, then the next pixel (n−1) on the left side thereof should satisfy the following condition 2.

(ii) Condition 2

1) cld=White;
2) cld=Gray1, and clmax(M, C, Y)=C; or
3) cld=Color, and clmax(M, C, Y)=C The next pixel (n+1) on the right side of the target pixel should satisfy the following condition 3a.

(iii) Condition 3a 1) cld=Gray0; or
2) cld=Black

If a pixel (target pixel) judged "Gray1" is in the black rising edge of a thin line, as shown in FIG. 11, the next pixel (n+1) on the right side thereof should satisfy the following condition 3b.

(iv) Condition 3b 1) cld=Gray1 and clmax(M, C, Y)=Y; or
2) cld=Color and clmax(M, C, Y)=Y The condition 3a and the condition 3b are combined into condition 3.

(v) Condition 3

1) cld=Gray0;
2) cld=Black;
3) cld=Gray1 and clmax(M, C, Y)=Y; or
4) cld=Color and clmax(M, C, Y)=Y When a pixel n (target pixel) judged "Gray1" has a maximum density color of cyan C (satisfying the condition (satisfying the condition 1), if the next pixel (n−1) on the left side thereof satisfies the above condition 2 and the next pixel (n+1) on the right side thereof satisfies the above condition 3, then the target pixel n judged to be in the black rising edge portion, and thus the pixel color, cld, of the target pixel is changed from "Gray1" to "Gray0" for correction.

If with the target pixel n satisfying the above condition 1, the next pixel (n−1) on the left side thereof does not satisfy the above condition 2 or the next pixel (n+1) on the right side thereof does not satisfy the above condition 3, it is judged that the target pixel n is not in the black rising edge and thus, the pixel color, cld, of the target pixel n is changed from "Gray1" into "Color" for correction.

The condition 4 is defined as that a pixel (target pixel) judged "Gray1" has the maximum density color, clmax(M, C, Y), of yellow Y.

(vi) Condition 4 clmax(M, C, Y)=Y

If the condition 4 is satisfied, whether the target pixel is in a black falling edge or not is determined based on the pixels adjacent thereto.

If a pixel n (target pixel) judged "Gray1" is in the black falling edge, as shown in FIG. 12, the next pixel (n−1) on the left side thereof should satisfy the following condition 5a.

(vii) Condition 5a
1) cld=Gray0; or
2) cld=Black

The next pixel (n+1) on the right side of the target pixel should satisfy the following condition 6.

(viii) Condition 6
1) cld=White;
2) cld=Gray1 and clmax(M, C, Y)=Y; or
3) cld=Color and clmax(M, C, Y)=Y If a pixel (target pixel) judged "Gray1" is in the black falling edge of a thin line as shown in FIG. 13, the next pixel (n−1) on the left side thereof should satisfy the following condition 5b.

(ix) Condition 5b
1) cld=Gray1, and clmax(M, C, Y)=C; or
2) cld=Color, and clmax(M, C, Y)=C The condition 5a and the condition 5b are combined into condition 5.

(x) Condition 5
1) cld=Gray0;
2) cld=Black;
3) cld=Gray1 and clmax(M, C, Y)=C; or
4) cld=Color and clmax(M, C, Y)=C When a pixel n (target pixel) judged "Gray1" has a maximum density color, clmax(M, C, Y), of yellow Y (satisfying the condition 4), if the next pixel (n−1) on the left side thereof satisfies the above condition 5 and the next pixel ((n+1) on the right side thereof satisfies the above condition 6, then the target pixel n is judged to be in the black falling edge, and the pixel color, cld, thereof is changed from "Gray1" into "Gray0" for correction.

If with the target pixel n satisfying the above condition 4, the next pixel (n−1) on the left side thereof does not satisfy the above condition 5 or the next pixel ((n+1) on the right side thereof does not satisfy the above condition 6, it is judged that the target pixel n is not in the black falling edge, and the pixel color, cld, thereof is changed from "Gray1" into "Color" for correction.

The pixel color judging section 2 outputs pixel color judgment result data, cld(While, Color, Gray0, Black).

(d) Result Synthesis Section 3

Figure 4:
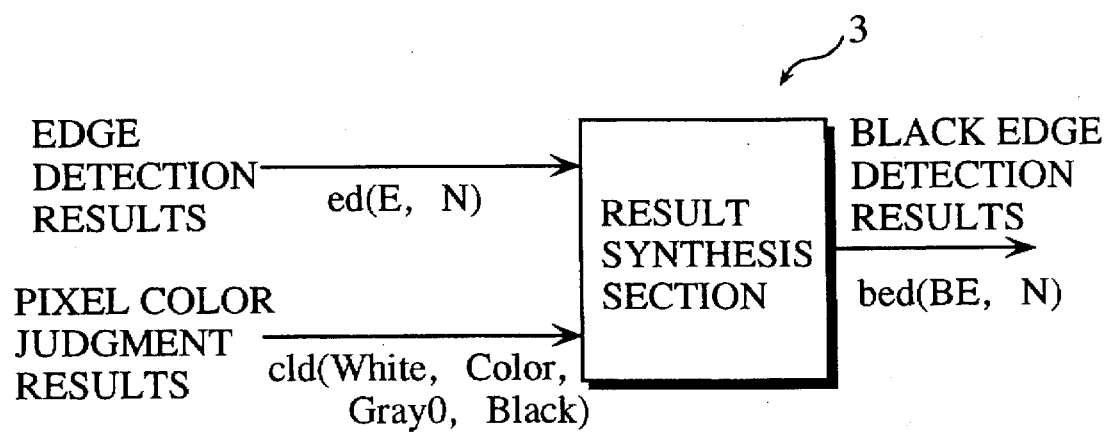
FIG. 4 is a block diagram illustrating the arrangement of the result synthesis section of FIG. 1.

FIG. 4 illustrates the arrangement of the result synthesis section 3.

The result synthesis section 3 determines if a target pixel is a black edge pixel or not, based on edge detection result data, ed(E, N), applied by the edge detecting section 1 and pixel color judgment result data, cld(White, Color, Gray0, Black), applied by the pixel color judging section 2.

Specifically, judged a black edge pixel, bed(BE) is a pixel which is judged "Gray0" or "Black" by the pixel color judging section 2 and which is judged to be in a high density edge, ed(E), by the edge detecting section 1. The other pixels are determined to be non-black edge pixel, bed(N).

In the above described embodiment, whether a pixel of a black edge is gray or not is determined with reference to its adjacent pixels, and considered are the characteristics of a pixel color and a maximum density color of the black edge which depend upon an arrangement order of color filters in the scanner. This permits correct judgment on the cld of gray of the black edge, thereby assuring correct judgment on the black edge.

[2] Second Embodiment

Figure 15:
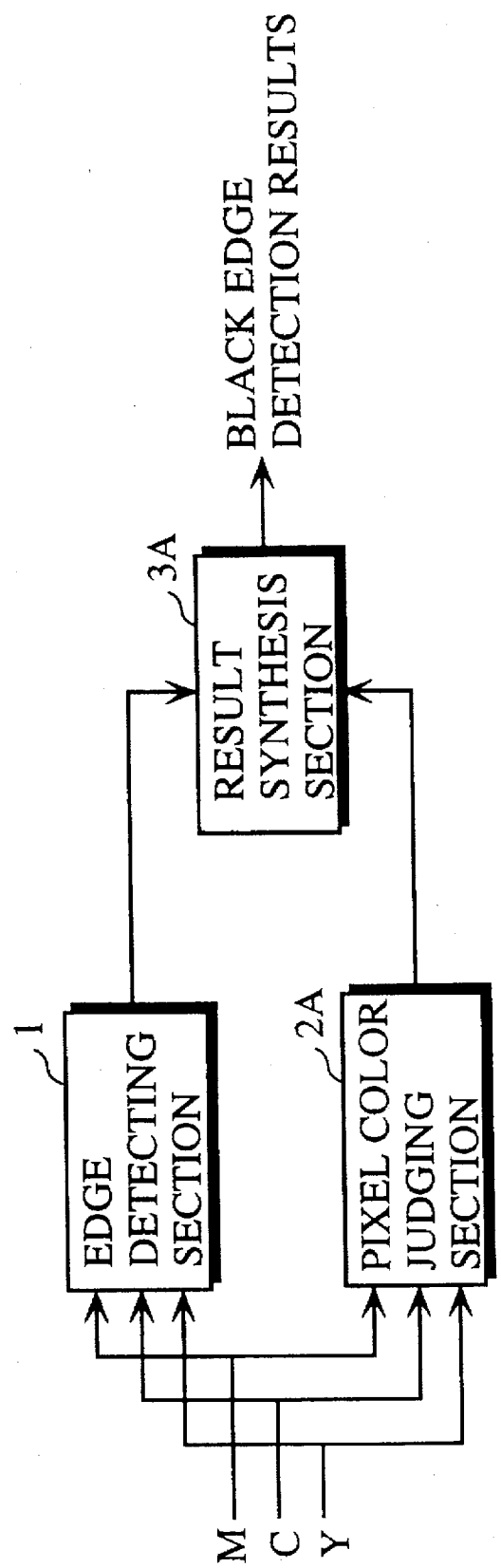
FIG. 15 is a block diagram illustrating the arrangement of a black edge detecting section according to a second embodiment of the present invention.
Figure 16:
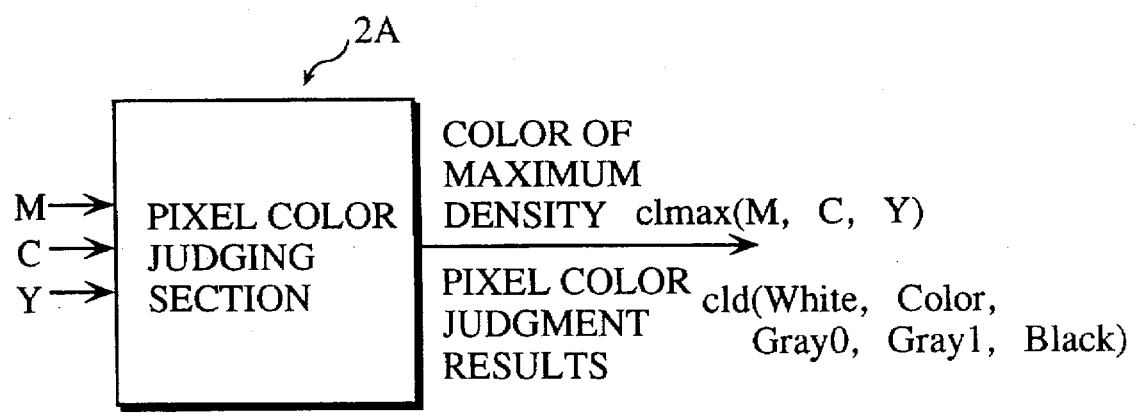
FIG. 16 is a block diagram illustrating the arrangement of the pixel color judging section of FIG. 15.
Figure 17:
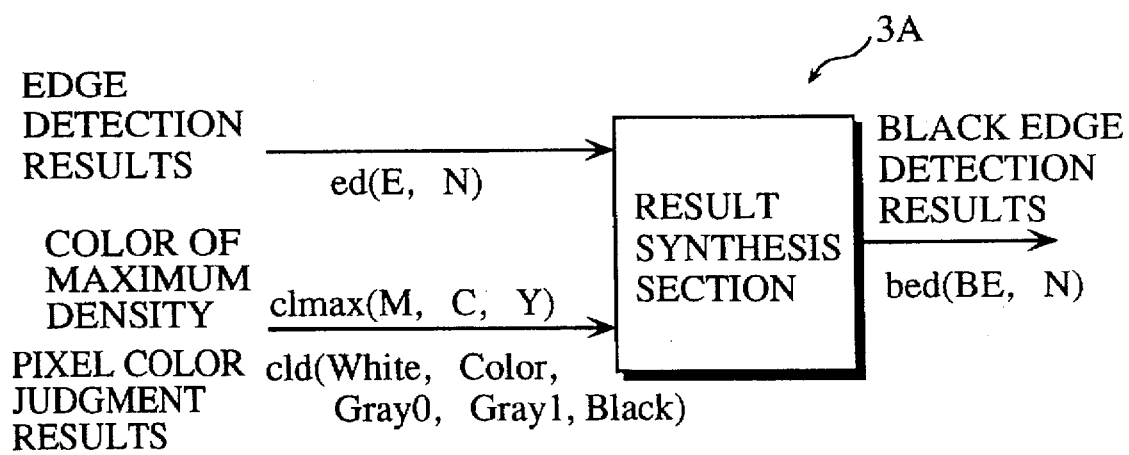
FIG. 17 is a block diagram illustrating the arrangement of the result synthesis section of FIG. 15.

Referring to FIGS. 15 to 17, a second embodiment of the invention will be described in detail as below.

(a) Arrangement of Black Edge Detecting Section

FIG. 15 illustrates the arrangement of a black edge detecting section.

The black edge detecting section comprises an edge detecting section 1, a pixel color judging section 2A and a result synthesis section 3A. The edge detecting section 1 and the pixel color judging section 2A are supplied with M, C, Y signals which are generated from signals read by a scanner not shown. The result synthesis section 3A is supplied with detection results obtained by the edge detecting section 1 and judgment results made by the pixel color judging section 2A. It outputs black edge detection results. The color filters disposed in the scanner are arranged in the order of B, G and R in the scanning direction, as shown in FIG. 14.

(b) Edge Detecting Section 1

The arrangement of the edge detecting section 1 is the same with that of of the edge detecting section 1 of the first embodiment (FIG. 2), and therefore, the description thereof is omitted.

(c) Pixel Color Judging Section 2A

FIG. 16 illustrates the arrangement of the pixel color judging section 2A.

The pixel color judging section 2A performs a pixel color judging process based on M, C, Y data of each pixel.

More specifically, a maximum density, max(M, C, Y), and a color of the maximum density, clmax(M, C, Y), are first extracted from the M, C, Y data of a target pixel.

Additionally, a minimum density, min(M, C, Y), and a color of the minimum density, clmin(M, C, Y), are extracted from the M, C, Y data of the target pixel.

Then, a pixel color, cld, of the target pixel is judged based on the maximum density max(M, C, Y) and the minimum density, min(M, C, Y), of the target pixel. In the pixel color judging process, a color of the target pixel is selected from black (Black), white (White), gray (Gray0), "assumed-to-be-gray" (Gray1) and chromatic color (Color). The pixel color judging process uses the following 5 threshold values.

tbk: a threshold value for Black, which is set to be, for example, from 160 to 170.

twh: a threshold value for White, which is set to be, for example from 30 to 40.

tglv: a threshold value for Gray level, which is set, for example, at 70.

tgw0: a threshold value for Gray0 range, which is set, for example, at 30.

tgw1: a threshold value (tgw0<tgw1) for Gray1 range, which is set, for example, at 60.

The judgment conditions and the judgment results are as follows:

(i) If min(M, C, Y)>tbk, it is judged that cld=Black.

(ii) If max(M, C, Y)<twh, it is judged that cld=White.

(iii) If not applicable to the above condition (i), and if min(M, C, Y)≧tglv, and max(M, C, Y)−min(M, C, Y)≦, it is judged that cld=Gray0.

(iv) If not applicable to the above condition (i) or (iii), and if min(M, C, Y)≧tglv, and max(M, C, Y)−min(M, C, Y)≦tgw1, it is judged that cld=Gray1.

(v) If not applicable to the above conditions (i) through (iv), it is judged that cld=Color.

As it is indicated by the above judgment conditions and judgment results, the judgment conditions for "assumed-to-be-gray" (Gray1) are set less rigid than those for gray (Gray0).

The pixel color judging section 2A outputs pixel color judgment result data, cld(White, Color, Gray0, Gray1, Black), and maximum density color data, clmax(M, C, Y).

(d) Result Synthesis Section 3A

FIG. 17 shows the arrangement of the result synthesis section 3A.

The result synthesis section 3 determines whether the target pixel is a black edge pixel or not based on edge detection result data, ed(E, N), applied by the edge detecting section 1, and pixel color judgment result data, cld(White, Color, Gray0, Gray1, Black) and maximum density color data, clmax(M, C, Y), applied by the pixel color judging section 2A.

When the target pixel applies to one of the following three conditions A, B and C, it is judged that the pixel is a black edge pixel bed(BE) and the other pixels are non-black edge pixels bed(N).

(i) Condition A

A pixel which is judged "Gray0" or "Black" by the pixel judging section 2A and which is determined to be in a high density edge, ed(E), by the edge detecting section 1.

(ii) Condition B

A pixel which is judged "Gray1" by the pixel color judging section 2A, which is determined to be in a high density edge, ed(E), and which has the maximum density color clmax(M, C, Y) of cyan (C).

(iii) Condition C

A pixel which is judged "Gray1" by the pixel color judging section 2A, which is judged to be in a high density edge, ed(E), by the edge detecting section 1, and which has a maximum density color clmax(M, C, Y) of yellow (Y).

The meaning of the above conditions B and C is described as below.

The pixel which is judged "Gray1" by the pixel color judging section 2A and which is judged to be in an edge of high density, ed(E), includes both a black edge pixel and a non-black edge pixel. Accordingly, in this example, whether the pixel is in an edge or not is determined based on the characteristics of M, C, Y signals of the black edge, which depend upon an arrangement order of color filters; if the pixel is in a black edge, it is determined to be a black edge pixel.

More specifically, as shown in FIG. 14, a pixel in a black rising edge presents a density relation of M, C, Y signals which is C>M>Y. On the other hand, a pixel in a black falling edge presents a density relation of M, C, Y signals which is Y>M>C. Accordingly, if a pixel which is judged "Gray1" and which is judged to be in a high density edge, ed(E), by the edge detecting section 1 is in a black edge, then the maximum density color, clmax(M, C, Y), thereof should be cyan (C) or yellow (Y).

Thus, if a pixel which is judged "Gray1" and which is determined to be in a high density edge, ed(E), by the edge detecting section 1 has a maximum density color, clmax(M, C, Y), of cyan (C) or yellow (Y)(Condition B, C), the pixel is judged to be in the edge, thus a black edge pixel, bed(BE).

In the aforementioned embodiment, when a judgment is made on whether a pixel is in a black edge or not, the pixel having been judged to be "assumed-to-be-gray" by the pixel color judging section 2A and determined to be in a high density edge, ed(E), by the edge detecting section 1, then considered are the characteristics of a maximum density color of the black edge, which depend upon an arrangement order of color filters. This permits correct judgment on the black edge.

[3] Third Embodiment

Figure 18:
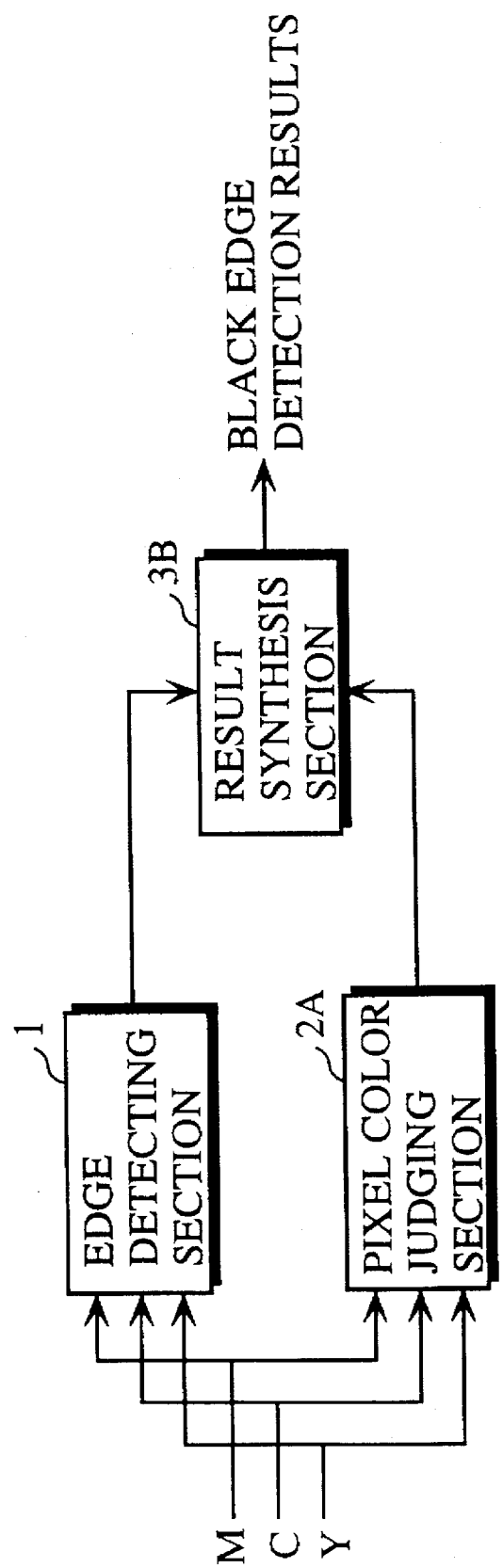
FIG. 18 is a block diagram illustrating the arrangement of a black edge detecting section according to a third embodiment of the present invention.
Figure 19:
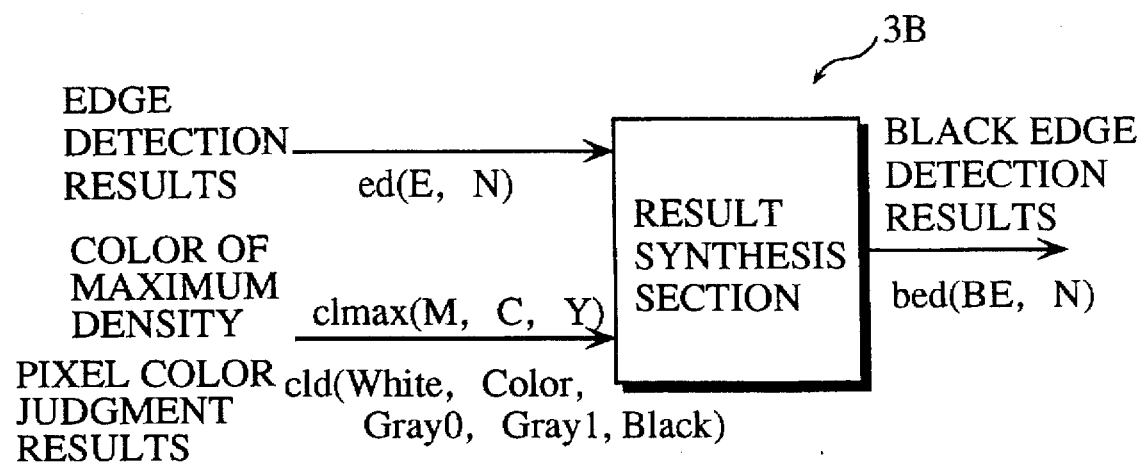
FIG. 19 is a block diagram illustrating the arrangement of the result synthesis section of FIG. 18.

Referring now to FIGS. 18 and 19, a third embodiment of the invention will be described in detail as below.

(a) Arrangement of Black Edge Detecting Section

FIG. 18 illustrates the arrangement of a black edge detecting section.

The black edge detecting section comprises an edge detecting section 1, a pixel color judging section 2A and a result synthesis section 3B. The edge detecting section 1 and the pixel color judging section 2A are supplied with M, C, Y signals which are generated from signals read by a scanner not shown. The result synthesis section 3B is supplied with detection results obtained by the edge detecting section 1 and judgment results obtained by the pixel color judging section 2A. The result synthesis section 3B outputs black edge detection results. Color filters in the scanner are arranged in the order of B, G and R in the scanning direction, as shown in FIG. 14.

(b) Edge Detecting Section 1

The arrangement of the edge detecting section 1 is the same with that of the edge detecting section 1 of the first embodiment (FIG. 2), and therefore, the description thereof is omitted.

(c) Pixel Color Judging Section 2A

The arrangement of the pixel color judging section 2A is the same with that of the pixel color judging section 2A of the second embodiment (FIG. 16), and therefore, the description thereof is omitted.

(d) Result Synthesis Section 3B

FIG. 19 illustrates the arrangement of the result synthesis section 3B.

The result synthesis section 3B determines if a target pixel is a black edge pixel or not, based on edge detection result data, ed(E,N), applied by the edge detecting section 1 and pixel color judgment result data, cld(White, Color, Gray0, Gray1, Black), and maximum density color, data max(M, C, Y), applied by the pixel color judging section 2A.

(i) With respect to a pixel judged "Gray0" or "Black" by the pixel color judging section 2A, the pixel is determined to be a black edge pixel, bed(BE), if it is judged to be in a high density edge (ed=E) by the edge detecting section 1, whereas the pixel is determined to be a non-black edge pixel, bed(N) if it is not judged to be in a high density edge (ed=E) by the edge detecting section 1.

(ii) A pixel judged to be "assumed-to-be-gray" (Gray1) by the pixel color judging section 2A is subject to blurred color correction with reference to the pixels adjacent thereto.

In the blurred color correction, whether a pixel is in a black edge or not is judged with reference to the pixels adjacent thereto, which pixel has been judged "Gray1" by the pixel color judging section 2A and has been determined in a high density edge, ed(E), by the edge detecting section 1. If the pixel is in the black edge, it is determined to be a black edge pixel, bed(BE), otherwise a non-black edge pixel, bed(N).

If a pixel n (target pixel) which is judged "Gray1" and determined to be in a high density edge, ed(E), is in a black rising edge, as shown in FIG. 10 or 11, the density relation of M, C, Y of the target pixel n is C>M>Y due to the arrangement of color filters, and hence, the maximum density color, clmax(M, C, Y), of the target pixel n is cyan (C).

If a pixel n (target pixel) which is judged "Gray1" and determined to be in a high density edge, ed(E), is in a black falling edge, as shown in FIG. 12 or 13, the density relation of M, C, Y of the target pixel n is Y>M>C, and hence, the maximum density color, clmax(M, C, Y), of the target pixel n is yellow(Y).

If a pixel n (target pixel) which is judged "Gray1" has a maximum density color, clmax(M, C, Y), of magenta (M), it is determined that the target pixel n is not in the black edge, and hence, it is a non-black edge pixel, bed(N).

Condition 1 is defined as that a pixel n (target pixel) judged "Gray1" has a maximum density color, clmax(M, C, Y), of cyan (C) and presents an edge detection result of high density edge, ed(E).

(i) Condition 1 clmax(M, C, Y)=C

If the condition 1 is satisfied, whether the target pixel is in a black rising edge or not is judged with reference to the pixels adjacent thereto.

If the target pixel n is in the black rising edge, as shown in FIG. 10, the next pixel (n−1) on the left side thereof should satisfy the following condition 2.

(ii) Condition 2

1) cld=White;

2) cld=Gray1, clmax(M, C, Y)=C, and ed=N; or 3) cld=Color, clmax(M, C, Y)=C, and ed=N The next pixel (n+1) on the right side of the target pixel n should satisfy the following condition 3a.

(iii) Condition 3a 1) cld=Gray0; or 2) cld=Black

If a pixel (target pixel) judged "Gray1" is in the rising edge of a thin line, as shown in FIG. 11, the next pixel (n+1) on the right side thereof should satisfy the following condition 3b.

(iv) Condition 3b 1) cld=Gray1, clmax(M, C, Y)=Y, and ed=E; or 2) cld=Color, clmax(M, C, Y)=Y, and ed=E The condition 3a and the condition 3b are combined into condition 3.

(v) Condition 3

1) cld=Gray0;

2) cld=Black;

3) cld=Gray1, clmax(M, C, Y)=Y, and ed=E; or 4) cld=Color, clmax(M, C, Y)=Y, and ed=E When a pixel n (target pixel) judged "Gray1" has a maximum density color, clmax(M, C, Y), of cyan (C) and an edge detection result of high density edge, ed(E),(satisfying the condition 1), if the next pixel (n−1) on the left side thereof satisfies the above condition 2 and the next pixel (n+1) on the right side thereof satisfies the above condition 3, then the target pixel n is determined to be in the black rising edge, and hence, a black edge pixel, bed(BE).

If with the target pixel n satisfying the above condition 1, the next pixel (n−1) on the left side thereof does not satisfy the above condition 2 or the next pixel (n+1) on the right side thereof does not satisfy the above condition 3, it is determined that the target pixel n is not in the black rising edge, and hence, it is a non-black edge pixel, bed(N).

Condition 4 is defined as that a pixel n (target pixel) judged "Gray1" has a maximum density color, clmax(M, C, Y), of yellow (Y) and an edge detection result of high density, ed(E).

(vi) Condition 4 clmax(M, C, Y)=Y

If the condition 4 is satisfied, whether a target pixel is in a falling edge or not is determined with reference to the pixels adjacent thereto.

If the pixel n (target pixel) judged "Gray1" is in a black falling edge, as shown in FIG. 12, the next pixel on the left side thereof (n−1) should satisfy the following condition 5a.

(vii) Condition 5a 1) cld=Gray0; or 2) cld=Black

Whereas the next pixel (n+1) on the right side thereof should satisfy the following condition 6.

(viii) Condition 6

1) cld=White;

2) cld=Gray1, clmax(M, C, Y)=Y, and ed=N; or 3) cld=Color, clmax(M, C, Y)=Y, and ed=N If a pixel judged (target pixel) judged "Gray 1" is in the falling edge of a thin line, as shown in FIG. 13, the next pixel on the left side thereof (n−1) should satisfy the following condition 5b.

(ix) Condition 5b 1) cld=Gray1, clmax(M, C, Y)=C, and ed=E; or 2) cld=Color, clmax(M, C, Y)=C, and ed=E The condition 5a and the condition 5b are combined into condition 5.

(x) Condition 5

1) cld=Gray0;

2) cld=Black;

3) cld=Gray1, clmax(M, C, Y)=C, and ed=E; or 4) cld=Color, clmax(M, C, Y)=C, and ed=E When a pixel n (target pixel) judged "Gray1" has a maximum density color, clmax(M, C, Y), of yellow (Y) and an edge detection result of high density edge, ed(E), (satisfying the condition 4), if the next pixel (n−1) on the left side thereof satisfies the above condition 5 and the next pixel (n+1) on the right side thereof satisfies the above condition 6, the target pixel n is determined to be in a black falling edge, and hence, a black edge pixel, bed(BE).

If, with the target pixel n satisfying the above condition 4, the next pixel (n−1) on the left side thereof does not satisfy the above condition 5 or the next pixel (n+1) on the right side thereof does not satisfy the above condition 6, then it is determined that the target pixel is not in the black falling edge, and hence, it is a non-black edge pixel bed(N).

In the above described embodiment, when a judgment is made on whether a pixel is in a black edge or not, the pixel having been judged to be "assumed-to-be-gray" by the pixel color judging section 2A and determined to be in a high density edge, ed(E), by the edge detecting section 1, then considered are the characteristics of a maximum density color of the black edge, which depend upon an arrangement order of color filters. This permits a correct judgment on the black edge.

[4] Fourth Embodiment

Figure 20:
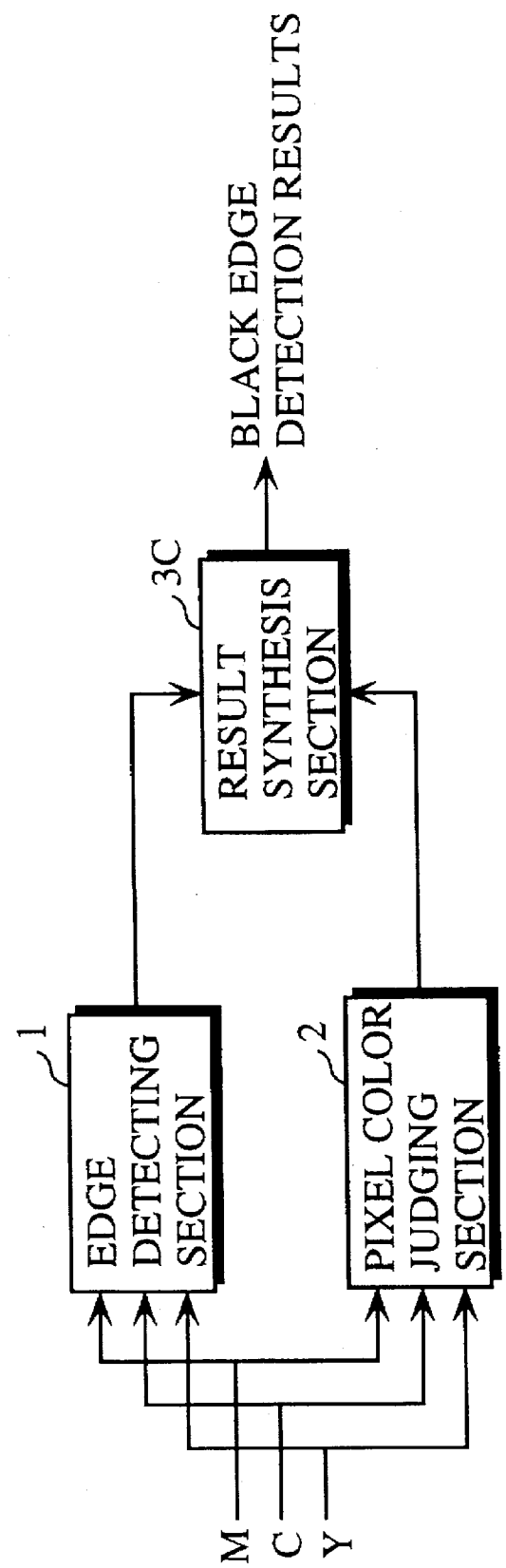
FIG. 20 is a block diagram illustrating the arrangement of a black edge detecting section according to a fourth embodiment of the present invention.
Figure 21:
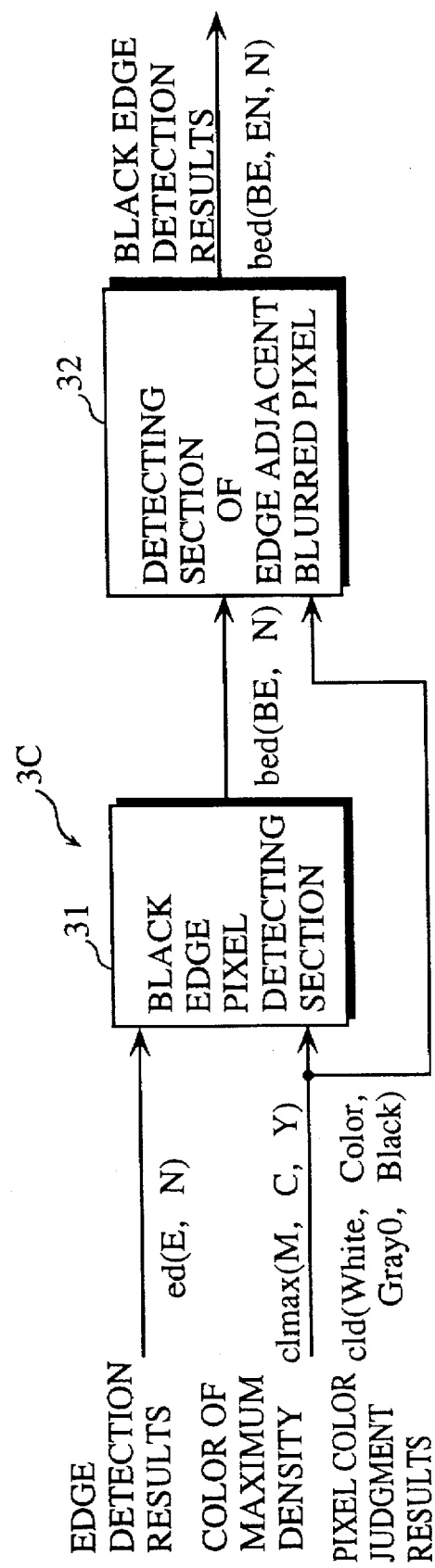
FIG. 21 is a block diagram illustrating the arrangement of the result synthesis section of FIG. 20.

Referring now to FIGS. 20 and 21, a fourth embodiment of the invention will be described in detail as below.

(a) Arrangement of Black Edge Detecting Section

FIG. 20 illustrates the arrangement of a black edge detecting section.

The black edge detecting section comprises an edge detecting section 1, a pixel color judging section and a result synthesis section 3C. The edge detecting section 1 and the pixel color judging section 2 are supplied with M, C, Y signals generated from signals read by a scanner not shown. The result synthesis section 3C is supplied with detection results obtained by the edge detecting section 1 and judgment results obtained by the pixel color judging section 2. The result synthesis section 3C outputs black edge detection results. Color filters provided in the scanner are arranged in the order of B, G and R in the scanning direction, as shown in FIG. 14.

(b) Edge Detecting Section 1

The arrangement of the edge detecting section 1 is the same with that of the edge detecting section 1 of the first embodiment (FIG. 2), and therefore the description thereof is omitted.

(c) Pixel Color Judging Section 2

The arrangement of the pixel color judging section 2 is the same with that of the pixel color judging section 2 of the first embodiment (FIG. 3), and therefore, the description thereof is omitted.

(d) Result Synthesis Section 3C

FIG. 21 illustrates the arrangement of the result synthesis section 3C.

The result synthesis section 3C comprises a black edge pixel detecting section 31, and a detecting section 32 for edge adjacent blurred color pixel.

(d-1) Black Edge Pixel Detecting Section 31

The black edge pixel detecting section 31 determines if a target pixel is a black edge pixel or not according to edge detection result data, ed(E,N), applied by the edge detecting section 1 and pixel color judgment result data, cld(White, Color, Gray0, Gray1, Black), applied by the pixel color judging section 2.

More specifically, judged a black edge pixel, bed(BE), is a pixel which is judged "Gray0" or "Gray1" by the pixel color judging section 2 and which is judged to be in a high density edge, ed(E), by the edge detecting section 1. The other pixels are determined to be non-black edge pixels, bed(N). (d-2) Detecting Section 32 for Edge Adjacent Blurred Color Pixel In the detecting section 32 for edge adjacent blurred color pixel, judgment is made on whether a target pixel is a pixel (edge adjacent blurred color pixel) in a boundary portion between a black edge and a white or chromatic colored base, with reference to black edge detection result data, bed(BE, N), applied by the black edge pixel detecting section 31 as well as pixel color judgment result data, cld(White, Color, Gray0, Black), and maximum density color data, clmax(M, C, Y), which are applied by the pixel color judging section 2.

A reason for judging on an edge adjacent blurred color pixel is to enhance a black edge. Specifically, the respective M, C, Y signals of a pixel judged an edge adjacent blurred color pixel are uniformalized to the minimum value, min(M, C, Y), thereof, thereby to reduce the density of a boundary portion between the black edge and the base portion, and thus the black edge is enhanced.

When a target pixel and its adjacent pixels satisfy the following condition A or B, the target pixel is determined to be an edge adjacent blurred color pixel, bed(EN). The condition A is for determining if the target pixel is an edge adjacent blurred color pixel of a boundary portion between a black rising edge and a base portion (corresponding to a pixel (n−1) in FIG. 10). The condition B is for determining if a target pixel is an edge adjacent blurred color pixel of a boundary portion between a black falling edge and a base portion (corresponding to a pixel (n+1) in FIG. 12).

(i) Condition A

1) That a target pixel n presents the black edge pixel judgment result of non-black edge pixel, bed(N), the pixel color judgment result of chromatic color (Color) and the maximum density color of cyan (C);

2) that the next pixel (n−1) on the left side thereof presents the black edge judgment result of non-black edge pixel, bed(N), and the pixel color judgment result of white (White) or chromatic color (Color); and 3) that the next pixel (n+1) on the right side thereof presents the black edge judgment result of black edge pixel, bed(BE).

(ii) Condition B

1) That a target pixel n presents the black edge pixel judgment result of non-black edge pixel, bed(N), the pixel color judgment result of chromatic color (Color) and the maximum density color of yellow (Y);

2) that the next pixel (n−1) on the left side thereof presents the black edge pixel judgment result of black edge pixel, bed(BE); and 3) that the next pixel (n+1) on the right side thereof presents the black edge judgment result of non-black edge pixel, bed(N), and the pixel color judgment result of white (White) or chromatic color (Color).

In the above described embodiment, whether a pixel of a black edge is gray or not is determined with reference to its adjacent pixels, and considered are the characteristics of a pixel color and a maximum density color of the black edge, which correspond to an arrangement order of color filters in the scanner. Thus, correct judgment on a gray pixel of the black edge is assured, thereby permitting a correct judgment on the black edge.

Additionally, the above described embodiment detects an edge adjacent blurred color pixel and therefore, by effecting a predetermined process on the M, C and Y signals of the edge adjacent blurred pixel thus detected, the black edge can be enhanced.

What is claimed is:

1. An image processing apparatus comprising:

means for reading a color image to convert it into three primary color data which correspond to the respective densities of the three primary colors;

edge detecting means for detecting a pixel of an edge portion based on the three primary color data;

pixel color judging means for judging a color of a target pixel based on the three primary color data of the target pixel and pixels adjacent thereto; and black edge detecting means for detecting a pixel of a black edge portion based on an edge detection result applied by the edge detecting means and a pixel color judgment result applied by a pixel color judging means, the pixel color judging means including:

first judgment means which, based on the three primary color data of a target pixel, determines a color of the target pixel by selecting from black, white, chromatic color, gray and "assumed-to-be-gray", and second judgment means which judges a color of a target pixel either gray or chromatic color based on a maximum density color of the target pixel and pixel colors and maximum density colors of pixels adjacent thereto, the target pixel having been judged to be "assumed-to-be-gray" by the first judgment means, and wherein selection/judgment conditions of the second judgment means are established based on the characteristics of a pixel color and maximum density color of a pixel of a black edge portion, which characteristics depend upon an arrangement order of color filters in a scanner.

2. An image processing apparatus comprising:

means for reading a color image by means of a scanner to convert it into three primary color data which correspond to the respective densities of the three primary colors;

edge detecting means for detecting a pixel of an edge portion based on the three primary color data;

pixel color judging means for judging a color of a target pixel based on the three primary colors; and black edge detecting means for detecting a pixel of a black edge portion based on an edge detection result, and on a pixel color and a maximum density color of the target pixel, the pixel color judging means determining a color of a target pixel by selecting from five colors including white, black, chromatic color, gray, and "assumed-to-be-gray" based on the three primary color data of the target pixel, and the black edge detecting means including judgment means which judges a target pixel a black edge pixel if a maximum density color of the target pixel is a maximum density color of a black edge which is determined by an arrangement order of color filters in a scanner, the target pixel having been determined to be an edge pixel by the edge detecting means and judged to be "assumed-to-be-gray" by the pixel color judging means.

3. An image processing apparatus comprising:

means for reading a color image by means of a scanner to convert it into three primary color data which correspond to the respective densities of the three primary colors;

edge detecting means for detecting a pixel of an edge portion based on the three primary color data;

pixel color judging means for judging a color of a target pixel based on the three primary color data; and black edge judging means for determining whether the target pixel is a black edge pixel or not, based on an edge detection result, a pixel color and a maximum density color of the target pixel, and based on edge detection results, pixel colors and maximum density colors of pixels adjacent the target pixel, the pixel color judging means determining a color of a target pixel by selecting from five colors including white, black, chromatic color, gray, and "assumed-to-be-gray" based on the three primary color data of the target pixel, and the black edge judging means including first judgement means which determines whether the target pixel is a black edge pixel or not based on a maximum density color of the target pixel, and based on edge detection results, pixel colors and maximum density colors of pixels adjacent thereto, the target pixel having been judged an edge pixel by the edge detecting means and judged to be "assumed-to-be-gray" by the pixel color judging means, and wherein judgement conditions of the of the first judgment means are established based on the characteristics of a pixel color and a maximum density color of a black edge portion, which characteristics depend upon an arrangement order of color filters in a scanner, and based on the characteristics of an image density of the black edge portion.

4. An image processing apparatus comprising:

means for reading a color image by means of a scanner to convert it into three primary color data which correspond to the respective densities of the three primary colors;

edge detecting means for detecting a pixel of an edge portion based on the three primary color data;

pixel color judging means for judging a color of a target pixel based on the three primary color data; and black edge detecting means for detecting a pixel of a black edge portion based on an edge detection result of the edge detecting means and a pixel color judgment result of the pixel color judging means; and detecting means for blurred color pixel adjacent black edge which detects a pixel of a boundary portion between a black edge portion and a base portion, based on a black edge detection result of the black edge detecting means and a pixel color judgement result of the pixel color judging means, the pixel color judging means including:

first judgment means for determining a color of a target pixel by selecting from black, white, chromatic color, gray, and "assumed-to-be-gray" based on the three primary color data of the target pixel, and second judgment means which judges a color of the target pixel either gray or chromatic color based on a maximum density color of the target pixel and pixel colors and maximum density colors of pixels adjacent thereto, the target pixel having been judged to be "assumed-to-be-gray" by the first judgment means, and wherein selection/judgment conditions of the second judgment means are established based on the characteristics of a pixel color and a maximum density color of a black edge portion, which characteristics depend upon an arrangement order of color filters in a scanner.

5. An image processing apparatus as set forth in claim 4, wherein the detecting means for blurred color pixel adjacent black edge includes means for judging blurred color pixel adjacent black edge which determines whether a target pixel is in a boundary portion between a black edge and a base portion, based on a black edge detection result, a pixel color and a maximum density color of the target pixel; a black edge detection result of a next pixel on one side thereof; and a black edge detection result and a pixel color of the next pixel on the other side thereof.

6. An image processing apparatus as set forth in claim 5, wherein judgment conditions of the means for judging blurred color pixel adjacent black edge are established based on the characteristics of a pixel color and a maximum density color of said boundary portion, which characteristics depend upon an arrangement order of color filters in a scanner, and based on the characteristics of an image density of said boundary portion.

* * * * *